United States Patent [19]
Bate

[11] 3,973,473
[45] Aug. 10, 1976

[54] SHOE-DRUM BRAKES FOR VEHICLES

[75] Inventor: Anthony John Bate, Birmingham, England

[73] Assignee: Girling Limited, Birmingham, England

[22] Filed: Mar. 26, 1974

[21] Appl. No.: 454,916

Related U.S. Application Data

[63] Continuation of Ser. No. 208,359, Dec. 15, 1971, abandoned.

[30] Foreign Application Priority Data

Dec. 17, 1970 United Kingdom............... 60082/70

[52] U.S. Cl.......................................... 92/52; 92/65; 92/75
[51] Int. Cl.² ........................................ F01B 7/20
[58] Field of Search ............... 92/52, 65, 75, 86, 50, 92/69 R, 253, 63, 152, 130 A, 135

[56] References Cited
UNITED STATES PATENTS

| 3,150,563 | 9/1964 | Carrigan | 92/253 X |
| 3,431,730 | 3/1969 | Bueler | 92/75 X |
| 3,486,591 | 12/1969 | Scheffler | 92/75 X |
| 3,500,725 | 3/1970 | Haddock, Jr. | 92/75 |
| 3,554,333 | 1/1971 | Hoenick | 92/75 X |
| 3,673,926 | 7/1972 | Mohri | 92/75 X |
| 3,684,063 | 8/1972 | Crabtree | 92/75 X |
| 3,704,652 | 12/1972 | Hoenick | 92/86 X |

FOREIGN PATENTS OR APPLICATIONS 110,340   3/1964   Czechoslovakia ................ 92/75

Primary Examiner—William R. Cline
Assistant Examiner—Abraham Hershkovitz
Attorney, Agent, or Firm—Scrivener Parker Scrivener and Clarke

[57] ABSTRACT

In an hydraulic actuating assembly for a vehicle shoe-drum brake comprising first and second relatively slidable members, the first member is provided with a longitudinally extending bore which is closed at one end and in which works a portion of the second member, and a sealed hydraulic chamber is defined within the bore between the closed end of the first member and the second member. One of the members incorporates an inlet port for the chamber and a vent port is located in a portion of the wall of that member to provide an indication, by external leakage of hydraulic fluid, of failure of the sealing of the chamber.

6 Claims, 5 Drawing Figures

3,973,473

SHOE-DRUM BRAKES FOR VEHICLES

This is a continuation of application Ser. No. 208,359 filed Dec. 15, 1971 now abandoned.

This invention relates to improvements in shoe-drum brakes for vehicles and is concerned with hydraulic actuating assemblies for the shoes of such brakes.

The usual actuator is a double-ended hydraulic cylinder in which work two pistons each adapted to engage an end of one shoe, fluid under pressure being fed to the space between the pistons from a pedal-operated master cylinder or other source of pressure fluid. In another construction the actuator is a single-ended cylinder in which works a single piston with the cylinder and the piston each adapted to engage an end of the shoe, fluid under pressure being fed to the space between the piston and the closed end of the cylinder.

A serious disadvantage of these arrangements is that in the event of failure of a pipe line leading to the wheel cylinder, or even of a seal in the cylinder, the brake is put out of action and there may be no visual indication that a failure of a seal has taken place.

According to our invention, in an hydraulic actuating assembly for a vehicle shoe-drum brake comprising first and second relatively slidable members, the first member is provided with a longitudinally extending bore which is closed at one end and in which works a portion of the second member, and a sealed hydraulic chamber is defined within the bore between the closed end of the first member and the second member, one of the members incorporating an inlet port for the chamber and a vent port being located in a portion of the wall of that member to provide an indication, by external leakage of hydraulic fluid, of failure of the sealing of the chamber.

Conveniently a bleed port for the chamber may also be provided in the said one member so that all the ports for the chamber are accommodated within the same member, thereby facilitating production and economising in production costs. In one construction the first member comprises a first piston, and a second member comprises a second piston having a longitudinally extending bore which is closed at one end and in which the first piston works, both pistons in turn working in an open-ended bore of an hydraulic cylinder. In such a construction the inlet port and the vent port are provided in the wall of the second piston. A similar vent port may be provided in the wall of the cylinder for connection with the vent port in the second piston. Alternatively the vent port may simply communicate directly with one end of the cylinder.

When the first piston is of differential outline having a portion of smaller diameter working in the bore in the second piston and a portion of greater diameter working in the cylinder bore, a second sealed hydraulic chamber may be defined by the cylinder bore between the portion of the first piston which is of greater diameter and the adjacent inner end of the second piston. In such a construction a second inlet port for the second hydraulic chamber is provided in the wall of the cylinder, and the vent port is positioned so as to provide an indication, by external leakage of fluid, of failure of the sealing of one or both chambers.

In another construction the first member may comprise a single-ended hydraulic cylinder with the second member comprising a piston working in the bore of the cylinder. In such a construction the inlet port and the vent port are preferably provided in the wall of the cylinder.

The bore may be of stepped outline with the piston being of differential form having portions of greater and smaller diameters which work in corresponding portions of the bore. In such a construction a second sealed hydraulic chamber is defined between the portion of the piston which is of greater diameter and a shoulder at a step in diameter between the bore portions, a second inlet port for the second chamber being located in a portion of the wall of the bore which is of greater diameter, and the vent port being positioned in the wall of the portion of the bore which is of smaller diameter so as to provide an indication by external leakage of fluid, of failure of the sealing of one or both chambers.

Some embodiments of our invention are illustrated in the accompanying drawings in which.

Figure 1:
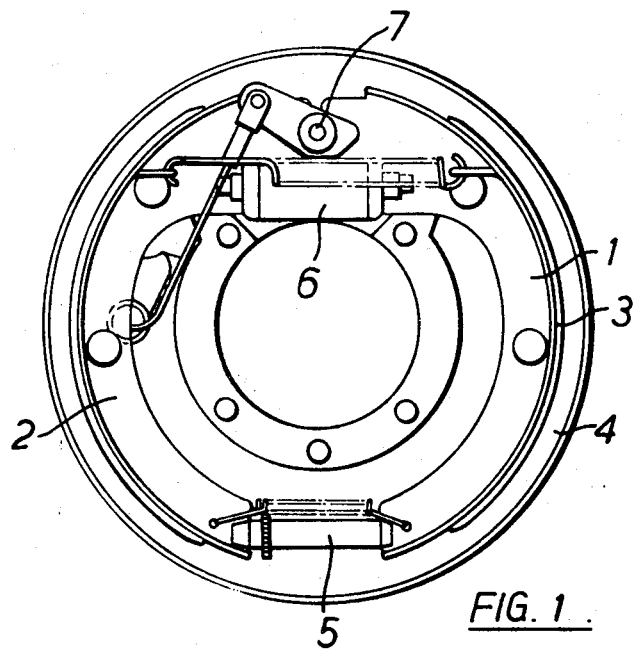
FIG. 1 is a plan view of a shoe-drum brake of the duo-servo type, with the drum omitted for clarity.

In the shoe-drum brake of the duo-servo type illustrated in FIG. 1 a pair of arcuate shoes 1 and 2 carrying friction linings 3 for engagement with a rotatable drum (not shown) are mounted on a stationary back plate 4. At their indirectly actuated ends the shoes are coupled or otherwise articulated together by a strut 5 of which the effective length is adjustable to compensate for wear of the friction linings 3.

For normal service braking the shoes are separated at their actuated ends by an hydraulic actuator assembly 6 in accordance with our invention. According to the direction of rotation of the drum, the primary shoe is carried round by the drum and transmits a force to the secondary shoe which anchors on a drag or torque taking pin or abutment 7 fixed to the back plate 4 at a position spaced radially outwards from the actuator assembly 6.

Figure 2:
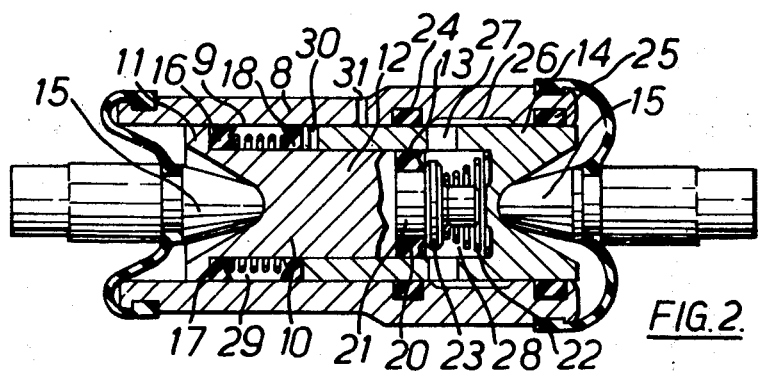
FIG. 2 is a longitudinal section of a double-ended hydraulic actuator assembly for use in the brake illustrated in FIG. 1.

The hydraulic actuator assembly 6 is illustrated in FIG. 2 of the drawings and comprises a cylinder 8 having a straight-through bore 9 open at each end. The cylinder is adapted to be rigidly mounted on the back-plate 4 or to be mounted on the back plate in such a way as to have a limited movement in a circumferential direction.

Working in one end of the cylinder bore 9 is a stepped first piston 10 of which the outer end 11 is a working fit in the bore of the cylinder and the inner end part 12 is of reduced diameter and is a working fit in an axial blind bore 13 in a second piston 14 which is a working fit in the cylinder bore 9. The outer ends of both pistons are adapted to act on the brake shoes 1 and 2 in the usual way through tappets 15 in rocking engagement with the pistons.

A cup seal 16 is mounted on the part 12 of the first piston 10 against a shoulder 17 at the step in diameter and a further seal 18 is located against the inner end of the second piston. A light compression spring 19 is arranged between these seals to locate them. A third seal 20 is mounted on a spigot extension 21 of the part 12 for co-operation with the bore 13 in the second piston 14 and is located by a spring 22 and washer 23.

Seals 24, 25 for the second piston 14 are located in annular grooves in the cylinder bore on opposite sides of an annular groove 26 of substantial axial length which is formed in the cylinder 8.

Pressure fluid from one source is supplied to the groove 26 from which it flows through ports 27 in the wall of the piston into a pressure space 28 formed by the bore 13 between the closed inner end of that bore and the inner end of the reduced diameter part 12 of the first piston 10.

A second pressure space comprises the annular space 29 around the part 12 of the first piston 10 between the shoulder 17 and the inner end of the second piston 14. Pressure fluid is fed to that space 20 through a port or groove (not shown) in the wall of the cylinder 8.

A small vent port 30 is formed in the wall of the second piston 14 on the inner side of the seal 18 and a similar port 31 is formed in the wall of the cylinder 8 on the inner side of the seal 24. Leakage from the port 31 to the outside will indicate the failure of a seal.

Figure 3:
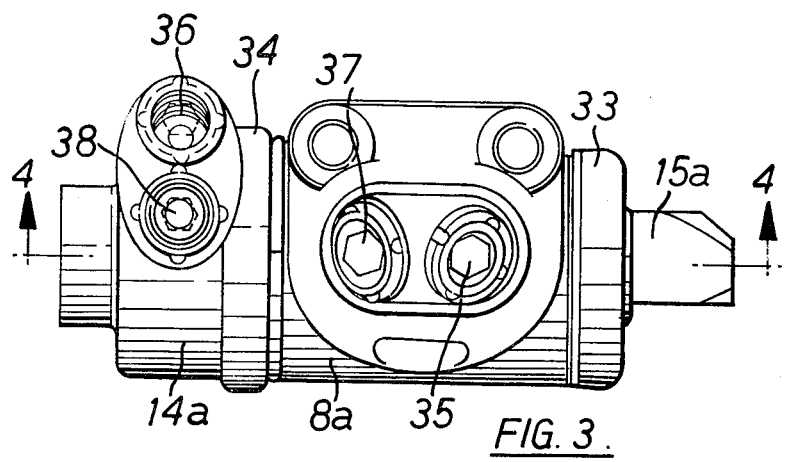
FIG. 3 is a side elevation of an actuator similar to FIG. 2 but incorporating some modifications.
Figure 4:
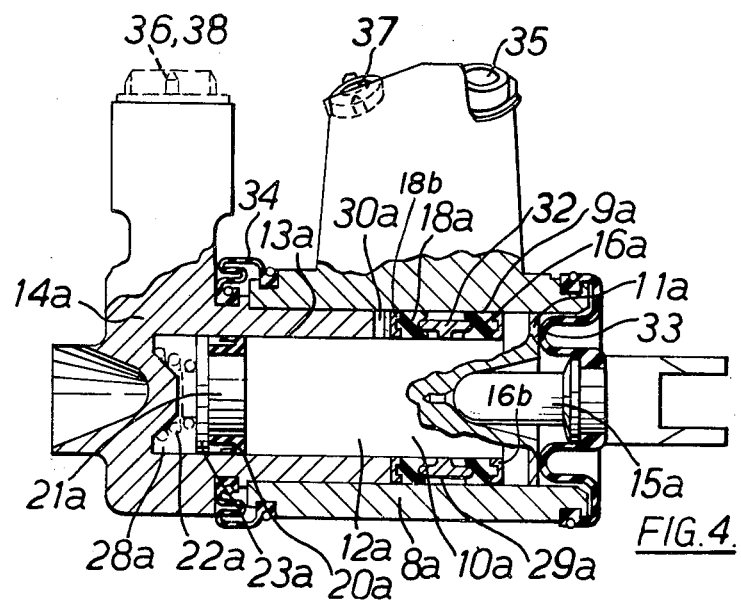
FIG. 4 is a section on the line 4—4 of FIG. 3.

In the hydraulic actuator assembly illustrated in FIGS. 3 and 4 the port 31 and the seals 24 and 25 are omitted, and the spring 19 is replaced by an annular retainer 32 which acts to locate the seals 16a and 18a which may be backed up by annular channel shaped seal supports 16b and 18b, respectively which may be formed of plastic. As in the embodiment of FIG. 2 a flexible boot 33 is connected at its inner and outer peripheral edges to the tappet 15a on which the piston 10a acts and to the adjacent end of the cylinder 8a to close that end of the cylinder 8a. In addition a second similar flexible boot 34 is connected between the piston 14a and the adjacent end of the cylinder 8a.

The inlet port in the cylinder 8a leading to the pressure space 29a is indicated at 35, and the inlet port leading to the pressure space 28a is provided in the piston 14a and is indicated at 36. Bleed connections for the pressure spaces 29a and 28a are provided at 37 and 38 in the cylinder 8a and in the piston 14a respectively.

External leakage from the vent port 30a to indicate the failure of a seal takes place between the bore 9a and the piston 14a and permiates through the flexible boot 34 at that end of the cylinder 8a.

Figure 5:
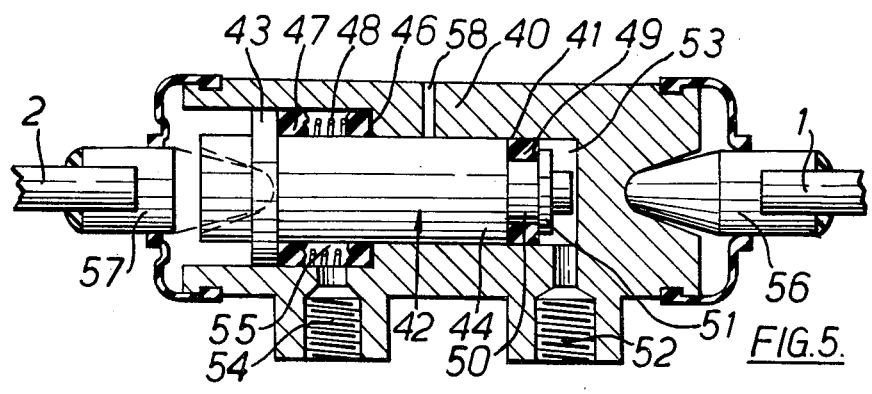
FIG. 5 is a longitudinal section of a single-ended hydraulic actuator assembly for use in the brake illustrated in FIG. 1.

A further modified construction of an hydraulic actuator assembly is illustrated in FIG. 5 of the drawings.

In the assembly illustrated in FIG. 5 a cylinder 40 is guided to slide in a slot in the back plate 4 or is floatingly supported by the shoes 1 and 2 independently of the back plate. The cylinder 40 is provided with a longitudinally extending stepped blind bore 41.

A stepped piston 42 works in the bore, the outer part 43 of the piston working in the part of the bore of greater diameter, and the inner part 44 working in the part which is of smaller diameter.

A cup seal 45 is mounted on the part 44 of the pistons against a shoulder 46 of the step in diameter, and a further seal 47 is located against the outer end of the piston 42. A light compression spring 48 is arranged between the seals 46 and 47 to locate them.

A third seal 49 is mounted on a spigot extension 50 of the part 44 for co-operation with the bore 41 and is located by a washer 51.

A pressure source is connected to a socket 52 leading into a pressure space 53 between the closed end of the bore and the inner end of the piston, and another pressure source is connected to a socket 54 leading into a pressure space 55 between the step in the diameter of the piston 42 and the step in the cylinder bore 41.

The outer ends of the cylinder 40 and the piston 42 act on the shoes 1 and 2 through rocking tappets 56 and 57 which are slotted to receive the shoe webs.

A small vent port 58 is formed in the wall of the cylinder 40 on the inner side of the seal 46 and on the inner side of the seal 49. Leakage of fluid through the port 58 to the exterior of the cylinder 40 indicates the failure of a seal.

In the embodiments described above the sources supplying the two pressure spaces may conveniently be the two pressure spaces of a tandem master cylinder. Alternatively, the two sources may be two separate master cylinders.

If the pipe line to either of the pressure spaces in an actuator assembly should fail or if a seal of a pressure space should fail the brake is still operative as it can be applied by pressure fluid supplied to the two pressure spaces.

Our improved actuator assembly can be made of the same axial length as the usual standard wheel cylinder for which it can be substituted in an existing design of brake without modifying the remainder of the brake.

Further, as the two pistons, or the piston and the cylinder, are urged apart by fluid in either pressure space failure of either system does not require additional fluid for the application of the brake by the other system, and therefore there is no additional pedal travel.

Although we have described hydraulic actuator assemblies for use in the shoe-drum brake illustrated in FIG. 1, it is to be understood that any of the actuators described above can be used in shoe-drum brakes of the two-leading, or one-leading and one-trailing shoe type where the non-actuated shoe ends, instead of being coupled together, abut against stationary drag taking abutments secured to the back plate.

I claim:

1. In an hydraulic actuating assembly for a vehicle shoe drum brake comprising an hydraulic cylinder having a wall defining an open-ended first bore, first and second pistons working in said first bore, said first piston having a wall defining a longitudinally extending second bore which is closed at one end, said second piston being of differential outline including larger and smaller diameter portions and having its smaller diameter portion working in said second bore, a first seal cooperating with the second piston and said second bore to define with said closed end a first sealed hydraulic chamber in said second bore, and a second seal axially spaced from said first seal and cooperating with said second piston, said first bore and said first piston to define one side of a sealed second hydraulic chamber in said first bore, a third seal axially spaced from said second seal and cooperating with the larger diameter portion of said second piston and said first bore to define the second side of the second hydraulic chamber, the improvement wherein the first seal normally prevents fluid leakage from said first to said second hydraulic chamber and the second seal prevents leakage from said second to said first hydraulic chamber or to atmosphere and wherein said third seal prevents leakage of fluid from said second chamber to atmosphere, the end of the wall of the first piston adjacent the closed end of said second bore extends axially outwardly beyond the corresponding end of said first bore, an inlet port for the first chamber extending through the side of the outwardly extending part of said wall, said first piston having self-contained passage means independent of said hydraulic cylinder providing communication at all times between said inlet port and said first chamber, and a vent port between said first and second seals and extending radially between said first and second bore, the inner and outer ends of said vent port communicating only with the smaller diameter part of said second piston and the inner surface of said first bore, respectively, and means providing a fluid flow passage between the outer end of said vent port and the exterior of the hydraulic cylinder to provide a visual indication of fluid leaking through said vent port from either said first or second seals.

2. An hydraulic actuating assembly as claimed in claim 1, wherein a second inlet port for said second hydraulic chamber is provided in said wall of said cylinder.

3. An hydraulic actuating assembly as claimed in claim 1 in which said vent port is radially disposed with the radially outer end thereof opening into said first bore, and said wall defining said first bore is continuous between said outer end of said vent port and that open end of said first bore which is distant from the larger diameter portion of said second piston whereby fluid leaking through said vent port must pass along said first bore to reach said open end of said cylinder.

4. An hydraulic actuating assembly as claimed in claim 1 in which said vent port is radially directed through said wall of said first piston and is axially located adjacent to said second hydraulic chamber whereby hydraulic fluid reaching said radially outer end of said vent port must pass a substantial distance along said first bore between said first piston and said wall defining said first bore to reach said open end of said first bore thereby providing a leakage path having a substantial flow resistance.

5. An hydraulic actuating assembly as claimed in claim 1, wherein said first piston also incorporates a bleed port for said first chamber.

6. The actuating assembly of claim 1 including an annular support between an inner end of at last one of said first and second pistons and the seal adjacent thereto.

* * * * *